(12) United States Patent
Thenthiruperai et al.

(10) Patent No.: US 7,437,772 B1
(45) Date of Patent: Oct. 14, 2008

(54) METHOD AND SYSTEM FOR ACCESS CONTROL BASED ON CONTENT-RATINGS AND CLIENT-SPECIFIED RATING ALLOWANCES

(75) Inventors: Balaji S. Thenthiruperai, Overland Park, KS (US); Kevin E. Hunter, Olathe, KS (US); Scott A. Papineau, Leawood, KS (US); R. Brian Landers, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 636 days.

(21) Appl. No.: 10/943,599

(22) Filed: Sep. 17, 2004

(51) Int. Cl.
*H04L 9/00* (2006.01)

(52) U.S. Cl. .......................... 726/30; 713/153; 705/52; 725/28

(58) Field of Classification Search .................. 726/31, 726/30; 713/153; 705/52; 709/229; 725/28
See application file for complete search history.

(56) References Cited

U.S. PATENT DOCUMENTS

| | | | |
|---|---|---|---|
| 7,043,555 B1 * | 5/2006 | McClain et al. | 709/229 |
| 7,149,219 B2 * | 12/2006 | Donahue | 370/392 |
| 2001/0030667 A1 | 10/2001 | Kelts | |
| 2003/0001016 A1 | 1/2003 | Fraier et al. | |
| 2004/0148237 A1 | 7/2004 | Bittmann et al. | |
| 2005/0097595 A1 | 5/2005 | Lipsanen et al. | |

* cited by examiner

*Primary Examiner*—Emmanuel L Moise
*Assistant Examiner*—Paul Callahan (57) ABSTRACT

A method and system provides for restricting access to particular network content. In one embodiment, a gateway can receive, from a client device, a content request that includes a rating-allowance for the requested content. The gateway can also receive, from a content provider, a content-rating for the requested content. The gateway can then compare the content-rating to the rating-allowance and, in response, either allow or block the delivery of that content to the client device.

21 Claims, 6 Drawing Sheets

| MIN + area code | Rating-Allowance |
|---|---|
| 111-222-3333 | PG-13 |
| 123-456-7890 | G |
| 987-654-3210 | PG |
| 999-888-7654 | G |

Fig. 5

| Content | Content-Rating |
|---|---|
| www.URI_1.com\page_1 | PG |
| www.URI_1.com\page_2 | R |
| www.URI_3.com\page_1 | PG-13 |
| www.URI_4.com | X |

METHOD AND SYSTEM FOR ACCESS CONTROL BASED ON CONTENT-RATINGS AND CLIENT-SPECIFIED RATING ALLOWANCES

FIELD OF THE INVENTION

The present invention relates to telecommunications and, more particularly, to access control for network communications such as HTTP or RTSP communications for instance.

BACKGROUND

The widespread availability of the Internet and mobile communications has ushered in an era of convenience and productivity never before seen. At the same time, however, the ubiquitous nature of the Internet has also brought with it an undesired side effect: youngsters and others who, for one reason or another, should not be accessing certain Web content can now easily do so. For example, there is a disturbingly large amount of content that is not fit for access by children. There is other content that may not be appropriate for employees to access while at work. These are only examples—there are numerous other reasons why someone may want to control access to particular network or Internet content.

Thus, a need exists for a mechanism to control access to such content.

SUMMARY

The present invention provides a method and system for controlling access to network communications based on real-time evaluation of content-ratings. Embodiments can advantageously enforce restrictions on accessing content by comparing a content-rating of requested content with a user's rating-allowance (or the rating-allowance programmed into a device used to request the content).

According to one embodiment, a gateway can receive a content request transmitted from a client device, and the content request can request particular content and carry a rating-allowance for the requested content. The gateway can also receive, from a content provider, a content-rating for the requested content. An entity, such as the gateway, for example, can compare the content-rating with the rating-allowance to make a determination whether the content-rating falls within the rating-allowance. An entity, such as the gateway, can then either allow delivery of the requested content to the client device if the determination is that the content-rating falls within the rating-allowance, or block delivery of the requested content to the client device if the determination is that the content-rating does not fall within the rating-allowance.

Other embodiments include a system adapted to sit within a communication path between a client device and a content server. The system can comprise at least one communication interface for (a) receiving from the client device a request for content, (b) proxying the request to a content server, (c) receiving a response from the content server, and (d) proxying the response to the client device. The system can also comprise data storage and program logic stored in the data storage and executable by at least one processor (i) to read a rating-allowance from the request, (ii) to read a content-rating from the response, (iii) to make a determination whether the content-rating falls within the rating-allowance, (iv) to allow delivery of content to the client device if the determination is that the content-rating falls within the rating-allowance, and (v) to block delivery of the content to the client device if the determination is that the content-rating does not fall within the rating-allowance.

A variety of alternatives will become apparent to those skilled in the art upon review of the following detailed description.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary General Network Architecture

Figure 1:
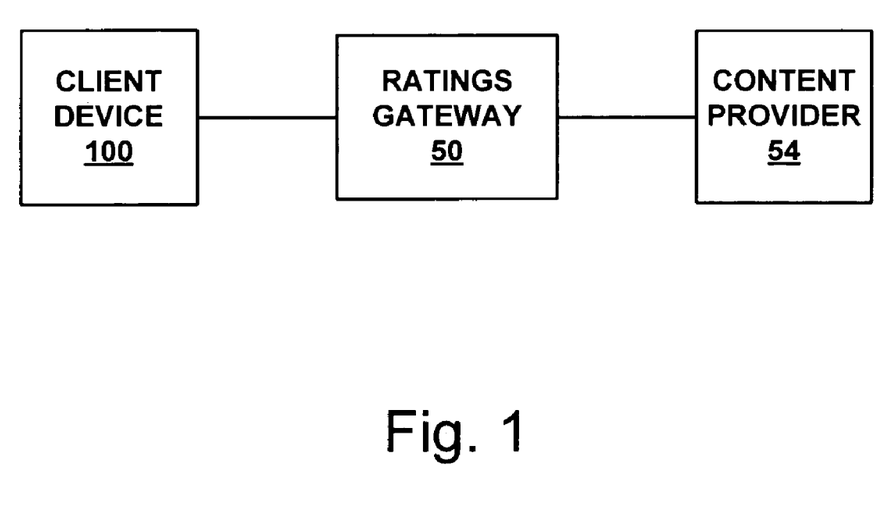
FIG. 1 is a block diagram illustrating an example communications path in accordance with one embodiment.

FIG. 1 illustrates one example of a basic embodiment of a communications path for controlling access to network communications based on real-time evaluation of content-ratings. As depicted in FIG. 1, a client device 100 (such as a mobile phone, wireless personal digital assistant ("PDA"), or personal computer, for instance) can send a content request to a content provider 54 via a ratings gateway 50 (for example, access gateway, portal, proxy server, or other entity). The gateway 50 can receive a rating-allowance from the client station 100 (with the content request, for example), and can receive a content-rating from a provider of the requested content.

The gateway 50 can then compare the rating-allowance specified in the content request with the content-rating specified by the provider to determine if the content-rating falls within the rating-allowance. If the content-rating falls within the rating-allowance, then the gateway 50 will allow delivery of the content from the content provider 54 to the client device 100. However, if the content-rating does not fall within the rating-allowance, then the gateway 50 will block delivery of the content to the client device 100.

Figure 2:
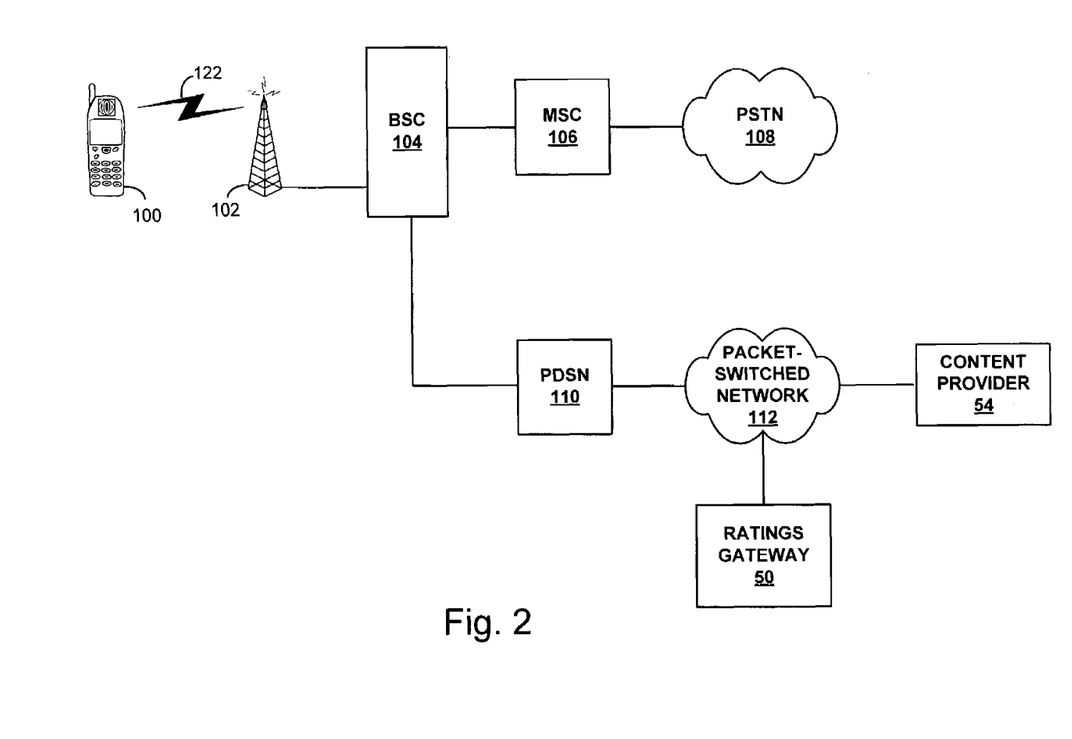
FIG. 2 is a block diagram of an embodiment of a communication system.

FIG. 2 illustrates one example of architecture of a wireless network in which the communication path of FIG. 1 can be implemented. While FIG. 2 depicts one client device 100 accessing the wireless network for voice and/or data services, the wireless network may alternatively simultaneously provide service to a plurality of different client devices.

As shown in FIG. 2, the client device 100 communicates with an access point for the wireless network, such as a base station 102, through an air interface 122. The client device 100 can communicate with the base station 102 using a variety of different air interface protocols. In an exemplary embodiment, the client device 100 communicates with the base station 102 using code division multiple access ("CDMA"). CDMA provides a method for sending wireless signals between the client device 100 and the base station 102.

In a CDMA system, the base station 102 communicates with the client device 100 over a spread spectrum of frequencies.

In a CDMA system, multiple client devices may use the same frequency range, and the multiple client devices may each simultaneously communicate with the base station 102 using the same frequency range. A client device in a CDMA system spreads its signal across the frequency range. Spreading the signal across a wide bandwidth can reduce interference between signals from different client devices. In order to perform signal spreading, each client device may be assigned a unique code, such as a Walsh code, to be used for modulating communications. The code may be a sequence of bits, such as a 64 bit binary number; however, other lengths may also be used. This can allow individual signals to be differentiated from other signals, and, therefore, accurately recovered.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

CDMA is merely one example of a protocol that can be used for communication between the client device 100 and the access point 102. As other examples, the client device 100 and the access point 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Communication ("GSM"), IS-136, Wireless Application Protocol ("WAP"), time division multiple access ("TDMA"), or other protocols. Additional wireless protocols such as any of the various protocols under the IEEE 802.11 umbrella, Bluetooth, and others may also be used.

The base station 102 couples to a base station controller ("BSC") 104, which can perform various functions such as managing handoffs of the client device 100 as it moves among base stations in the wireless network. The BSC 104 in turn connects to a mobile switching center ("MSC") 106. The MSC 106 can manage setup and teardown of connections with the client device 100. While the BSC 104 and the MSC 106 are depicted as separate components, it is possible that their functionality may be combined into a single component. The MSC 106 can additionally provide connectivity to the public switched telephone network ("PSTN") 108. Through this connectivity, the client device 100 may access the wireless network for voice services and in turn establish a circuit switched connection with another device on the PSTN 108, the wireless network, or another network.

While a traditional voice connection with the wireless network might involve establishing a circuit-switched connection between the client device 100 and another entity for voice communications, the client device 100 might alternatively establish a data connection with the wireless network in order to engage in packet-switched communications with another entity. In addition to interfacing with the 106 and in turn the PSTN 108, the BSC 104 may also interface with a packet data serving node ("PDSN") 110. The PDSN 110 can provide connectivity to a packet-switched network 112, which could comprise either or both of a private packet-switched network and a public packet-switched network, such as the Internet.

Using this connectivity, the client device 100 can establish a data connection with the wireless network and engage in packet-based communications with devices on the packet-switched network 112. In doing so, the client device 100 might use various protocols to engage in data communications with another device. The client device 100 might also use packet-based voice protocols such as Voice over IP ("VoIP") to engage in voice communications with another device via the client device's data connection with the wireless network.

In accessing the wireless network for data services, the client device 100 may establish a Point-to-Point Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the client device 100 may communicate with the PDSN 110 through a PPP session, it may communicate with other devices (e.g., a device on the packet-switched network 112) using higher level protocols. For example, the client device 100 may use the Transmission Control Protocol ("TCP")/Internet Protocol ("IP") suite, one protocol suite that may be used for transmitting data over a packet-switched network. Each device, including the client device 100, may then receive a 32-bit IP address. The IP address assigned to a device is usually globally unique, and therefore allows IP packets of data to be routed between different networks to a particular device. An IP packet can include a header portion and a data portion. The header portion generally identifies a source device and a destination device, while the data portion carries the data to be transmitted between the two devices.

Each client device may also be uniquely identified in other ways to facilitate identification. For example, each client device can be hard-coded with a unique electronic serial number ("ESN"), which can be programmed into each client device during manufacture and which can be initially activated by the service provider. In doing so, the service provider can assign a unique mobile identification number ("MIN") to each client device and can establish a record or other profile associating the MIN with the ESN and indicating service parameters for the subscriber (i.e., for the MIN).

A number of other entities can reside on or be accessible through the packet-switched network 112. One such entity might include, by way of example, the ratings gateway 50. Any number of other entities, such as the content provider 54, which, for example, can comprise a content server or other entity, might also reside on or be accessible through the packet-switched network 112, as well, and may host content that the client device 100 can request.

The entities residing on or accessible through the packet-switched network 112 can be arranged in any of a variety of ways. For example, the ratings gateway 50 might reside within another network entity or entities. As another example, the functions of the ratings gateway 50 might be integrated with the functions of another network entity. Other configurations are also possible.

In operation, each client device that supports packet-data connectivity can engage in packet-data communication over a packet network, such as the packet-switched network 112, after acquiring a radio link over an air interface and a data link with a PDSN or other gateway. As described generally above, for instance, a client device, such as the client device 100, can send an origination message to a BSC, such as the BSC 104, and/or an MSC, such as the MSC 106, asking for a radio link for packet-data communication. The BSC 104 can then responsively instruct the client device 100 to operate on a given traffic channel over the air interface 122. Through that traffic channel, the client device 100 might then negotiate with a gateway, such as the PDSN 110, to establish a data link such as the PPP session described above. Further, the gateway and/or some other entity such as a mobile-IP home agent or an authentication, authorization, and accounting server (not shown) could assign an IP address to the client device 100 for use in communicating over the packet-switched network 112.

Figure 3:
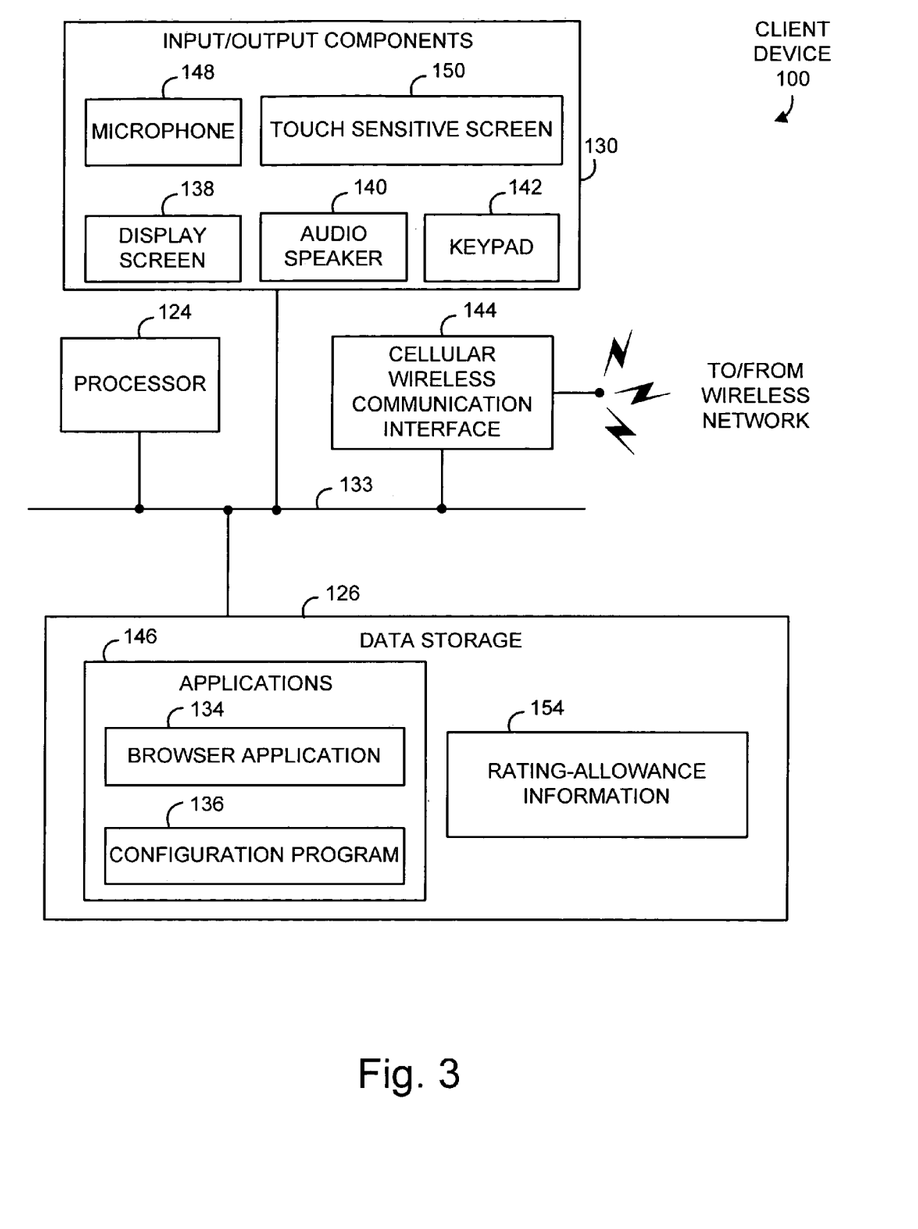
FIG. 3 is a block diagram illustrating example components of a client device.

FIG. 3 is a block diagram showing components of an example client device 100. The client device 100 can include a processor (i.e., one or more processors) 124, data storage 126, and machine language instructions stored in the data storage 126. The machine language instructions can be executable by the processor 124 to perform various functions described herein. The machine language instructions can also define applications 146 that could be stored in the data storage 126. The example client device 100 also includes a cellular wireless communication interface component 144, through which the client device 100 can communicate with the wireless network. Further, the client device 100 can include input and output components 130. The various components of the client device 100 (including the processor 124, the data storage 126, the interface component 144, and the input and output components 130) might be coupled together directly or via a system bus 133, for instance. Other arrangements are possible as well.

As shown by way of example in FIG. 3, the input and output components 130 could include a display screen 138, an audio speaker 140, a keypad 142, a microphone 148, and a touch sensitive screen 150. The client device 100 might also include other or additional input and/or output components, or the client device 100 might have fewer input and/or output components than those shown in FIG. 2. In an exemplary embodiment, the client device 100 might have multimedia capabilities such as an ability to display video and play audio. In other embodiments, however, the client device 100 may not have multimedia capabilities, or the client device 100 may be capable of only playing audio or of only displaying video, or it might be limited in some other way, such as by not having a display screen 138 or an audio speaker 140.

The data storage 126 can store applications 146 and data (such as rating-allowance information 154), for example. In alternative embodiments, the applications 146 and/or data might not be stored in the client device 100. In such embodiments, the applications 146 and/or data might be stored remotely on a network server, for example. The remote network server can then be accessible to the client device 100, and the client device 100 may then access such applications 146 and/or data via the wireless network.

As shown in FIG. 3, the applications 146 can include, for example, a browser application 134 and a configuration program 136. The applications 146 might utilize the various input and output components 130 of the client device 100 and, thereby, interact with the user and/or allow the user to interact with the client device 100. For example, one or more applications might output text or video on the display screen 138; play audio on the speaker 140; receive input from the keypad 142, the touch sensitive screen 150, and/or the microphone 148; or perform a combination of these or other actions.

In particular, the browser application 134 might be an application suitable for requesting and receiving packet-data communications in a client device, such as the client device 100. In one embodiment, the browser application 134 might be a WAP enabled Web browser that allows WAP Push communications. In any case, the browser application 134 can request content from the content provider 54 via the packet-switched network 112, for example. In one embodiment, the browser application 134 can request information from the content provider 54 (or another network resource) by invoking a URL included in a WAP Push message. For instance, the browser application 134 can request information from the server 52 (or another network resource) via an HTTP GET request. Other examples are also possible.

The configuration program 136 might be an application suitable for specifying a rating-allowance for the client device 100 to provide with each content request that it sends. Advantageously, embodiments of the present invention can facilitate parental control over content presented on the client device 100. To achieve this in a preferred embodiment, the configuration program 136 can provide an interface through which a parent, for example, could specify a rating-allowance for the client device 100. Preferably, the configuration program 136 would be password protected so that a child (or other user) could not access the program or change the rating-allowance. The configuration program 136 would then store the rating-allowance in a profile on the client device 100 (for example, as the rating-allowance information 154), and the device 100 would programmatically include the rating-allowance in each content request that it sends.

A telecommunications service provider or other entity could provide the configuration program 136 to the client device 100 via network transmission. For instance, a user of the device 100 could download the program to the device 100 via a wireless or landline data session. Alternatively, the configuration program 136 could be pre-installed on the client device 100 at the time of manufacture or at the time of distribution of the client device 100 to an end-user. In one exemplary embodiment, the configuration program 136 could be JAVA based, but it could equally take other forms as well.

Figure 4:
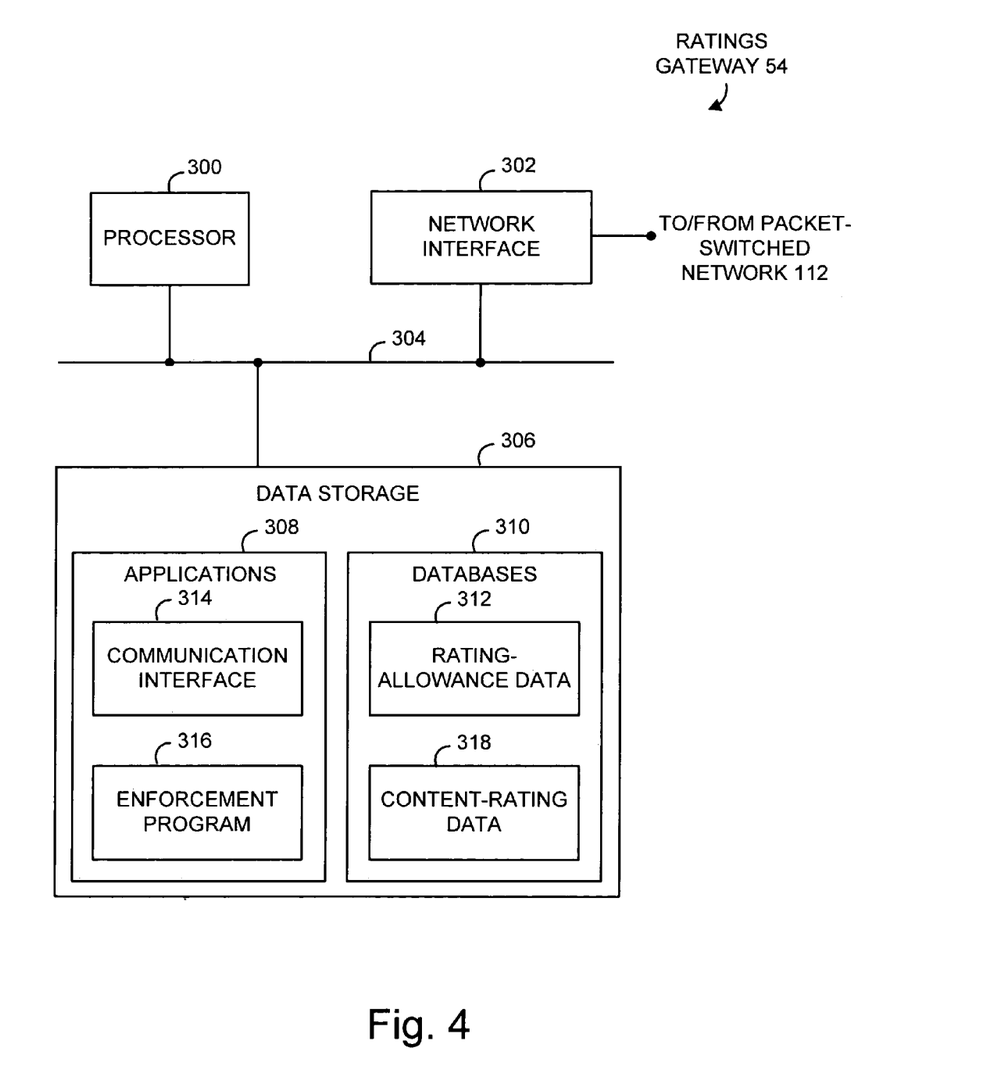
FIG. 4 is a block diagram illustrating example components of a ratings gateway.

FIG. 4 is a block diagram showing components of an example gateway, such as the ratings gateway 50 depicted in FIGS. 1 and 2. As depicted in FIG. 4, the ratings gateway 50 can include a processor 300, data storage 306, and machine language instructions stored in the data storage 306 and executable by the processor 300 to carry out various functions described herein. The machine language instructions can define applications 308 that can also be stored in the data storage 306. The ratings gateway 50 might also include a network interface component 302 through which the ratings gateway 50 can communicate with a packet network, such as the packet-switched network 112, for instance. The various components of the ratings gateway 50 (including the processor 300, the data storage 306, and the network interface 302) can be coupled together directly or via a system bus 304, for instance. Other arrangements are possible as well.

The data storage 306 can include any number of databases 310, applications 308, or other files of information, for, among other things, maintaining content-rating and rating-allowance data and blocking/allowing delivery of requested content to the client device 100. In some embodiments, the ratings gateway 50 can store rating-allowances, for example, as rating-allowance data 312 in the data storage 306. The rating-allowance data 312 can include a plurality of records that contain information that associates each of a plurality of client devices with a particular rating-allowance. Similarly, in some embodiments, the ratings gateway 50 can store content-ratings, for example, as content-rating data 318 in the data storage 306. The content-rating data 318 can include a plurality of records that contain information that associates particular content with a content-rating.

Figure 5:
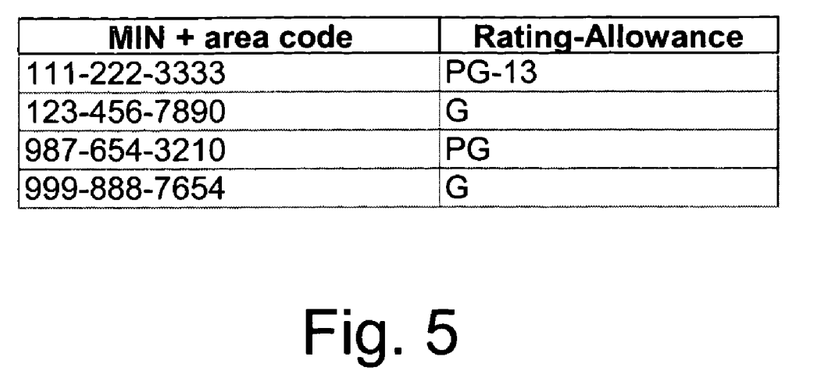
FIG. 5 is an example rating-allowance data table in accordance with an embodiment of the present invention.

FIG. 5 depicts an example table (such as a look-up table, for instance) of rating-allowance data 312. In FIG. 5, each record is depicted as a row in the example table and includes a plurality of fields (which are depicted as columns). Thus, in the example table of FIG. 5, each record includes a client device (which, in this example, are identified by each client device's unique MIN plus its area code) and a rating-allowance for blocking or allowing requested content. In the example of FIG. 5, the first client device listed in the table, identified as 111-222-3333, corresponds to the rating-allowance "PG-13," which would only allow requested content that carried a "PG-13" rating or lower. Other methods of identifying client devices, such as by using unique ESNs, for example, are possible as well.

Figure 6:
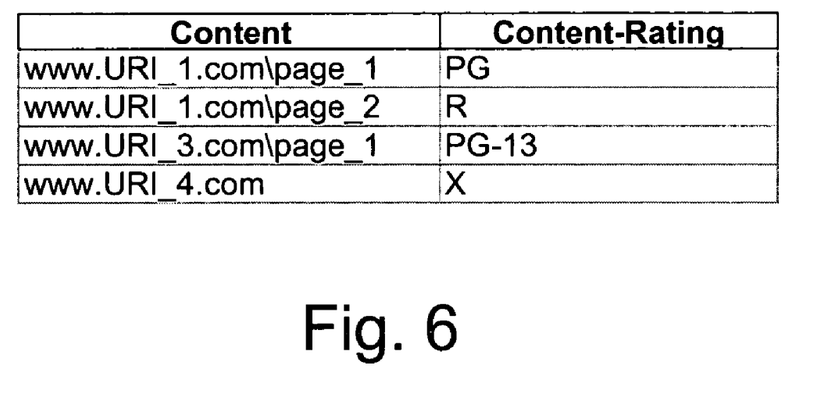
FIG. 6 is an example content-rating data table in accordance with an embodiment of the present invention.

FIG. 6 depicts an example table (such as a look-up table, for instance) of content-rating data 318. In FIG. 6, each record is depicted as a row in the example table and includes a plurality of fields (which are depicted as columns). Thus, in the example table of FIG. 6, each record includes an identification of content (which, by way of example, are identified as uniform resource indicators ("URIs")) and a content-rating for blocking or allowing requested content. In the example of FIG. 6, the first content identified in the table, www.URI_1.com\page_1, corresponds to the content-rating "PG," which would only allow the content to be sent to a client device with a rating-allowance of PG or higher.

As a general matter, the content-ratings contemplated by the invention are intended to relate to suitability of content for presentation to particular classes of people. As such, the content-ratings can indicate an appropriate audience for the content (such as that the content is suitable for a particular age group or for other particular types of users), the content-ratings can indicate a class of content (such as that the content contains sexually explicit material or violent material), and/or the content-ratings can take other forms. By way of example, the content-ratings can be identical or analogous to the ratings commonly used by the Motion Picture Association of America (MPAA), such as G, PG, PG-13, R, and X, as partially shown in FIG. 5. As another example, the ratings could more simply be just "High," "Medium," and "Low." As still another example, the ratings could be simple code numbers, such as "1," "2," and "3." Other examples are possible as well.

The rating-allowances, in turn, can take the same form as the content-ratings but might indicate a maximum allowed content-rating. For instance, if the content-ratings are G, PG, PG-13, R, and X, possible rating-allowances might also be G, PG, PG-13, R, and X. A rating-allowance of G might then mean that only G-rated content should be allowed but content rated PG, PG-13, R or X should be blocked, while a rating-allowance of R might mean that content rated G, PG, PG-13 or R should be allowed but content rated X should be blocked. As another example, if the content-ratings are "High", "Medium", and "Low", possible rating-allowances might also be "High", "Medium", and "Low". A rating-allowance of "Medium" might then mean that content rated "Medium" or "Low" should be allowed but content rated "High" should be blocked.

Alternatively, note that rating-allowances could be set forth in the negative, affirmatively indicating one or more content-ratings that are unacceptable. Such a rating-allowance would inherently indicate that other content-ratings are acceptable. For instance, given content-ratings of G, PG, PG-13, R, and X, a rating-allowance of "NOT R" could be used to indicate that content rated G, PG, or PG-13 should be allowed while content rated R or X should be blocked.

Further, it is possible that content-ratings and rating-allowances could take different forms. For instance, content-ratings could be G, PG, PG-13, R, and X, and rating-allowances could be "1", "2", "3", "4", and "5". In that case, when the ratings gateway 50 receives a rating-allowance from a client device, such as the client device 100, and a content-rating for the requested content from a content provider, such as content provider 54, the gateway 50 would programmatically map one to the other to determine whether the content-rating of the requested content falls within the specified rating-allowance. For example, if the specified rating-allowance is "2", the ratings gateway 50 may refer to mapping data in data storage and thereby determine that the rating-allowance means "PG". Given that rating-allowance, if the content-rating of the requested content is G or PG, then the ratings gateway 50 would allow delivery of the content to the client device, whereas if the content-rating of the requested content is R or higher, then the gateway 50 would block delivery of the content to the client device 100.

Turning back to FIG. 4, in one embodiment, the data storage 306 of the ratings gateway 50 can include a communication interface 314 and an enforcement program 316. The communication interface 314 can receive a content request and rating-allowance from the client device 100. Upon receipt, the communication interface 314 can communicate with a service provider, such as the service provider 54, to proxy the request, for example, and receive a response with a content-rating. The enforcement program 316 can then perform the comparison of the content-rating to the rating-allowance, and function to block or allow delivery of the content to the client device 100.

In an example embodiment, the data storage 306 might reside on the ratings gateway 50. In other embodiments, some or all of the data in data storage 306 might reside on other devices. In such a case, each data storage device may communicate with the ratings gateway 50 via a link such as a T1, IEEE 488, or Ethernet link, for example.

To allow packet-data connectivity, the ratings gateway 50 might connect to a packet network, such as the packet-switched network 112, through a local area network ("LAN"), for example. The ratings gateway 50 might connect to the LAN using a network interface 202, such as a network interface card ("NIC"), and the LAN, in turn, might provide connectivity to the packet-switched network 112 through an Internet service provider ("ISP") or another gateway. Alternatively, the ratings gateway 50 might connect to a private intranet (e.g., a core packet network of a wireless service provider) or to another network that provides connectivity to the packet-switched network 112. Further, the ratings gateway 50 might connect directly to the packet-switched network 112 without connecting through a LAN. The ratings gateway 50 might also wirelessly connect to the packet-switched network 112.

It should be understood, however, that all the arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. Exemplary Operation

Figure 7:
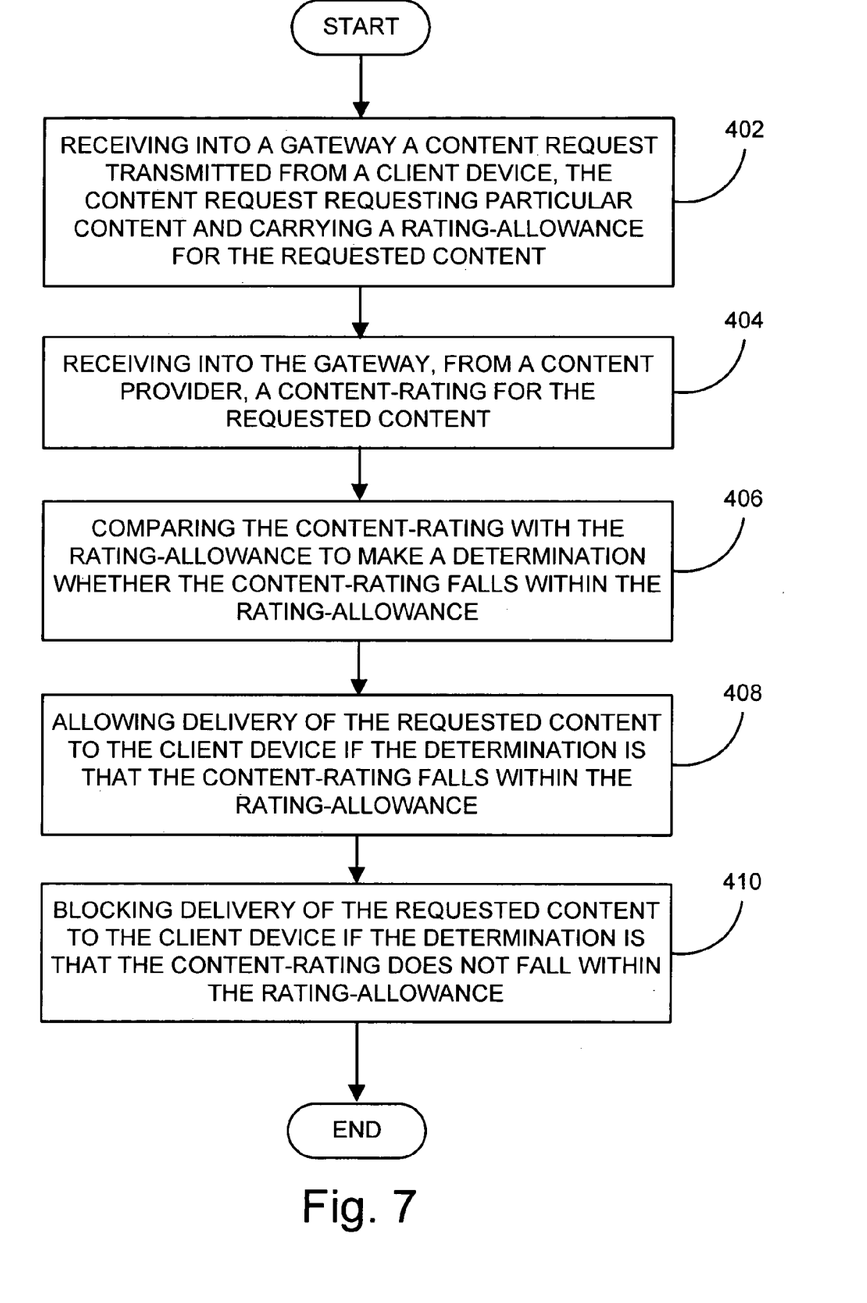
FIG. 7 is a flowchart illustrating a process carried out by a system in accordance with an example embodiment.

FIG. 7 is a flowchart that depicts functions that may be involved in controlling access to network communications based on real-time evaluation of content-ratings. At step 402 of FIG. 7, a gateway, such as the ratings gateway 50, for example, receives a content request transmitted from a client device, such as the client device 100, for example. The content request includes a request for content and a rating-allowance for the requested content.

The way in which the client device 100 specifies the rating-allowance in a content request can vary depending on the device type, the communication protocol, and other factors, provided that the gateway 50 can determine the specified rating-allowance from the content request. As a general matter a program application (for example, the browser application 134) on the client device 100 will generate the content request, and either that program application or some lower-layer logic will read the rating-allowance from data storage (for example, from the rating-allowance information 154) and insert it into the content request. Further, the rating-allowance can be inserted at various places in the content request, such as (i) in a header of a packet that carries the content request or (ii) in the body of the content request itself.

By way of example, if the client device 100 is a wireless handset or other device that operates under the WAP protocol, the device could be arranged to specify the rating-allowance as an "x-wap-profile-diff" parameter in the content request. In this regard, as is known in the art, a WAP-compliant device can conventionally include in its content requests an "x-wap-profile" parameter that specifies a URL where a gateway or other entity (such as the ratings gateway 50) can obtain a baseline profile for the device (e.g., the general profile for the make and model of the client device 100). Further, the device 100 can also include an x-wap-profile-diff parameter that specifies a variance from the baseline device profile. According to the preferred embodiment, the x-wap-profile-diff parameter could be used to specify a rating-allowance, provided that the ratings gateway 50 is programmed to read the x-wap-profile-diff parameter as a rating-allowance.

As another example, if the client device 100 uses HTTP or an analogous protocol to request Web content from a particular URL, the device 100 could specify a rating-allowance as a query parameter within the URL or as another sort of parameter within the HTTP header. Other examples are possible as well.

At step 404 of FIG. 7, a gateway, such as the ratings gateway 50, for example, receives from a content provider, such as the content provider 54, a content-rating for the requested content. The way in which the content provider 54 specifies the content-rating for the requested content can also take various forms, provided that the ratings gateway 50 can determine the content-rating specified by the provider 54. By way of example, if the content provider 54 engages in session-setup signaling to set up a session (for example, streaming media or real time transport protocol ("RTP")) through which to deliver the requested content, the content provider 54 could specify the content-rating as a parameter in a session-setup message. For instance, if the content provider 54 provides a session-description-protocol ("SDP") block within such a message, the content provider 54 could specify the content-rating as a parameter within the SDP block. As another example, if the content provider 54 returns content in an HTTP response, the content provider 54 could provide the content-rating in an HTTP header parameter. Other arrangements are also possible.

In an exemplary embodiment, the ratings gateway 50 will receive the content request from the client device 100 and will proxy the request along to the content provider 54. The content provider 54 will then return to the ratings gateway 50 a response message that contains the requested content and/or information related to delivery of the content (such as an SDP block). Preferably, the content provider 54 will include the content-rating in that or another message that it sends to the ratings gateway 50. Thus, when the gateway 50 receives the message from the content provider 54, the gateway 50 can read the content-rating from the message.

In an alternative embodiment, the ratings gateway 50 could cache or store content and associated content-ratings provided by content providers, in the content-ratings data 318, for example. Thus, when the gateway 50 receives a content request from a client device, the gateway 50 can retrieve from its cache or data storage 306 the content-rating that the content provider previously specified for the requested content.

In order to carry out the invention in a preferred embodiment, content requests from the client device 100 will be made to pass to the ratings gateway 50, such that the gateway 50 could proxy each content request to an appropriate content provider, such as the content provider 54 (if the gateway 50 has not already cached the content). This allows the requested content from the content provider to pass through the gateway 50 on its way back to the client device 100.

To accomplish this, the ratings gateway 50 could be positioned in (or at the edge of) an access channel so that all communications with the client device 100 pass through the gateway 50. Alternatively, the ratings gateway 50 could be positioned elsewhere, and the client device 100 (or some other entity) could be set to send content requests from the client device 100 to the gateway 50. For instance, the client device 100 could be set to use the ratings gateway 50 as a proxy server so that the client device 100 sends all content requests to the gateway 50.

As an example implementation, consider a scenario where a user of a WAP-capable client device, such as the client device 100, for example, seeks to obtain streaming media content. For instance, the user may browse to a Web page and click on a link to receive particular streaming media content. In response (as indicated by the markup underlying the link), a media player application on the client device 100 might send an RTSP "DESCRIBE" request, which would pass to the ratings gateway 50 for transmission in turn to a content server indicated by a URL in the DESCRIBE header. According to the invention, the DESCRIBE request could contain, in addition to the usual parameters, an x-wap-profile-diff parameter that specifies the rating, such as "x-wap-profile-diff='PG-13'". Upon receipt of the DESCRIBE request, or at some point thereafter, the ratings gateway 50 may then read the value of the x-wap-profile-diff parameter and, in this case, thereby determine that the rating-allowance for the content request is "PG-13".

Conventionally, the ratings gateway 50 would proxy the DESCRIBE request to the designated content server (which could correspond to the content provider 54 of FIGS. 1 and 2). The content server would then return to the gateway 50 a DESCRIBE response that carries an SDP block with session setup information, such as an indication of the media codec to use and so forth. According to this embodiment, the DESCRIBE response could further contain, in the SDP block for instance, a content-rating for the requested content. By way of example, the specified content-rating might be "PG" or "R".

At step 406 of FIG. 7, an entity, such as the ratings gateway 50, then compares the content-rating of the content with the rating-allowance of the client device 100. The ratings gateway 50 (or other entity) then makes a determination whether the content-rating falls within the ratings allowance.

In this case, if the content-rating is PG and the rating-allowance is PG-13, then the ratings gateway 50 would thereby determine that the content-rating falls within the rating-allowance. Consequently, at step 408 of FIG. 7, the ratings gateway 50 would allow delivery of the requested content (i.e., the gateway 50 would not responsively block delivery of the requested content). To allow delivery of the requested content in this scenario, the ratings gateway 50 could proxy the DESCRIBE response along to the client device 100 and allow further setup and delivery of the streaming media. (For instance, the ratings gateway 50 may thereafter proxy one or more RTSP SETUP, PLAY, and other requests from the client device 100 to the content server, and corresponding responses from the content server to the client device 100.)

On the other hand, if the content-rating is R and the rating-allowance is PG-13, then the ratings gateway 50 would thereby determine that the content-rating does not fall within the rating-allowance. Consequently, at step 410 of FIG. 7, the ratings gateway 50 would block delivery of the requested content. To block delivery of the requested content, the gateway 50 could simply send a DESCRIBE error response (for example, a DESCRIBE "400" series response) to the client device 100, indicating in the response a reason why the content is not available (such as "You are not permitted to access this content, due to an access control-rating.")

Note that this example implementation, while described with respect to a wireless client device, can equally apply with other sorts of client devices, whether wireless or landline. For instance, if a personal computer seeks to obtain streaming media content, the same process could apply. A possible difference in that case might be that the rating-allowance would be defined in some other way, rather than as an x-wap-profile-diff parameter value. Other variations are possible as well.

As another example implementation of the invention, consider a scenario where a user of a client device (such as a wireless or landline station) seeks to obtain content from a particular Web page. For instance, the user may attempt to browse to a particular Web page, thereby causing a browser on the client device to send an HTTP GET request, which would pass to the ratings gateway 50 for transmission in turn to a content server indicated by a URL in the DESCRIBE header. According to the invention, the HTTP request would contain, in addition to the usual parameters, a rating-allowance, such as "rating-allowance='PG-13'". Upon receipt of the HTTP request, or at some point thereafter, the ratings gateway 50 may then read the value of the rating-allowance and, in this case, thereby determine that the rating-allowance for the content request is "PG-13".

Conventionally, the ratings gateway 50 would proxy the HTTP request to the designated content server, and the content server would return to the gateway 50 an HTTP response that could carry the requested content. According to the invention, the HTTP response would further carry, in an HTTP header for instance, a content-rating for the requested content. As above, by way of example, the specified content-rating might be "PG" or "R".

In this example, if the content-rating is PG and the rating-allowance is PG-13, then the ratings gateway 50 would thereby determine that the content-rating falls within the rating-allowance. Consequently, the ratings gateway 50 would allow delivery of the requested content. In particular, the ratings gateway 50 would proxy the HTTP response (possibly translated to a form appropriate for display on the client device) to the client device.

On the other hand, if the content-rating is R and the rating-allowance is PG-13, then the ratings gateway 50 would thereby determine that the content-rating does not fall within the rating-allowance. Consequently, the ratings gateway 50 would block delivery of the requested content. For instance, the ratings gateway 50 may return to the client device an HTTP error response, such as a "400" series HTTP message, indicating a reason why the content is not available.

In accordance with another aspect of the invention, a telecommunications service provider may charge its subscribers for this access control service. To do this, the service provider could maintain a profile store accessible by the ratings gateway 50, which indicates for each subscriber (e.g., client device or user) whether the subscriber has paid for or agreed to be charged for the access control service.

When the ratings gateway 50 receives a content request from a client device, the gateway 50 may then first determine if the content request contains a rating-allowance. If so, the ratings gateway 50 may then query the profile store, based on a device-ID or user-ID specified in the content request, to determine whether the subscriber has paid for or agreed to be charged for the access control service. If the subscriber has already paid for or agreed to be charged for the access control service, then the ratings gateway 50 may carry out the access control functions as described above. On the other hand, if the subscriber has not already paid for or agreed to be charged for the access control service, then the ratings gateway 50 may invoke a charge-advice process through which a charging entity (e.g., the gateway 50 or another entity) seeks the subscribers' payment or approval to be charged for the service.

In an example-charge advice process, the charging entity may send to the client device 100 or to some other designated destination (e.g., to a parent's e-mail address) a prompt to pay or to approve charges for the access control service. The charging entity could send the prompt sent by e-mail, short messaging service ("SMS") messaging, instant messaging, or any of a variety of other means. (If possible, the charging entity could send the prompt in response to the content request provided by the client device 100, and could prompt the user to click a link in order to pay or approve charges.) A recipient of the prompt may then provide a password and payment information (e.g., credit card information) or authorization to be charged (e.g., to the subscriber's monthly telecommunications service account), in a response to the charging entity. Given subscriber payment or authorization to be charged, the charging entity may update the subscriber's profile record to reflect that the subscriber has paid for or agreed to be charged for the access control service, and the ratings gateway 50 may proceed with the access control functions described above.

3. Conclusion

Several exemplary embodiments of the present invention have been described above. Those skilled in the art will understand, however, that changes and modifications may be made to these embodiments without departing from the true scope and spirit of the present invention, which is defined by the claims.

We claim:

1. A method comprising:
   receiving into a gateway a content request transmitted from a client device, the content request requesting particular content and carrying a rating-allowance for the requested content;
   receiving into the gateway, from a content provider, a content-rating for the requested content;
   comparing the content-rating with the rating-allowance to make a determination whether the content-rating falls within the rating-allowance;
   carrying out the comparing function only if a subscriber has paid for or agreed to be charged for an access control service;
   allowing delivery of the requested content to the client device if the determination is that the content-rating falls within the rating-allowance; and
   blocking delivery of the requested content to the client device if the determination is that the content-rating does not fall within the rating-allowance.

2. The method of claim 1, further comprising:
   determining whether the subscriber has paid for or agreed to be charged for the access control service; and
   prompting the subscriber to pay for or agree to be charged for the access control service if the subscriber has not yet paid for or agreed to be charged for the access control service.

3. The method of claim 1, further comprising:
   providing a configuration program on the client device, through which the rating-allowance can be set on the client device.

4. The method of claim 3, further comprising:
   receiving into the configuration program an indication of the rating-allowance; and
   storing the rating-allowance on the client device.

5. The method of claim 4, further comprising:
   receiving into the client device a user request to obtain the particular content;
   generating the content request in the client device, including in the content request the rating-allowance; and
   sending the content request from the client device to the gateway.

6. The method of claim 1, wherein the content request carries the rating-allowance in a header of the request.

7. The method of claim 1, wherein the content request carries the rating-allowance as an x-wap-profile-diff parameter value.

8. A method comprising:
   receiving into a gateway a content request transmitted from a client device, the content request requesting particular content and carrying a rating-allowance for the requested content;
   receiving into the gateway, from a content provider, a content-rating for the requested content;
   comparing the content-rating with the rating-allowance to make a determination whether the content-rating falls within the rating-allowance;
   allowing delivery of the requested content to the client device if the determination is that the content-rating falls within the rating-allowance; and
   blocking delivery of the requested content to the client device if the determination is that the content-rating does not fall within the rating-allowance; and
   wherein the method further comprises:
      providing a configuration program on the client device, through which the rating-allowance can be set on the client device;
      receiving into the configuration program an indication of the rating-allowance; and
      storing the rating-allowance on the client device.

9. The method of claim 8, further comprising:
   carrying out the comparing function only if a subscriber has paid for or agreed to be charged for an access control service.

10. The method of claim 9, further comprising:
    determining whether the subscriber has paid for or agreed to be charged for the access control service; and
    prompting the subscriber to pay for or agree to be charged for the access control service if the subscriber has not yet paid for or agreed to be charged for the access control service.

11. The method of claim 8, further comprising:
    receiving into the client device a user request to obtain the particular content;
    generating the content request in the client device, including in the content request the rating-allowance; and
    sending the content request from the client device to the gateway.

12. The method of claim 8, wherein the content request carries the rating-allowance in a header of the request.

13. The method of claim 8, wherein the content request carries the rating-allowance as an x-wap-profile-diff parameter value.

14. The method of claim 8, further comprising:
    proxying the content request to a content server, wherein receiving the content-rating comprises receiving the content-rating in a response to the content request.

15. The method of claim 8, further comprising:
    performing a translation to facilitate comparing the content-rating with the rating-allowance.

16. A method comprising:
    receiving into a gateway a content request transmitted from a client device, the content request requesting particular content and carrying a rating-allowance for the requested content;
    receiving into the gateway, from a content provider, a content-rating for the requested content;
    comparing the content-rating with the rating-allowance to male a determination whether the content-rating falls within the rating-allowance;
    allowing delivery of the requested content to the client device if the determination is that the content-rating falls within the rating-allowance; and
    blocking delivery of the requested content to the client device if the determination is that the content-rating does not fall within the rating-allowance;
    wherein the content request carries the rating-allowance as an x-wap-profile-diff parameter value.

17. The method of claim 16, further comprising:
    carrying out the comparing function only if a subscriber has paid for or agreed to be charged for an access control service.

18. The method of claim 17, further comprising:
    determining whether the subscriber has paid for or agreed to be charged for the access control service; and
    prompting the subscriber to pay for or agree to be charged for the access control service if the subscriber has not yet paid for or agreed to be charged for the access control service.

19. The method of claim 16, further comprising:
    providing a configuration program on the client device, through which the rating-allowance can be set on the client device.

20. The method of claim 19, further comprising:
receiving into the configuration program an indication of the rating-allowance; and
storing the rating-allowance on the client device.

21. The method of claim 20, further comprising:
receiving into the client device a user request to obtain the particular content;

generating the content request in the client device, including in the content request the rating-allowance; and sending the content request from the client device to the gateway.

* * * * *